United States Patent [19]
Lehmann et al.

[11] Patent Number: 5,638,039
[45] Date of Patent: Jun. 10, 1997

[54] COIL BODY MADE OF SYNTHETIC MATERIAL, AN INJECTION MOLD AND METHOD OF MAKING THE COIL BODY

[75] Inventors: Eberhard Lehmann, Pfedelbach-Windischenbach; Peter Ahrens, Öhringen, both of Germany

[73] Assignee: Hohenloher Spulenkoerperfabrik GmbH & Co., Oehringen, Germany

[21] Appl. No.: 311,742

[22] Filed: Sep. 23, 1994

[30] Foreign Application Priority Data

Sep. 23, 1993 [DE] Germany .......................... 43 32 339.1

[51] Int. Cl.⁶ .................................................. H01H 1/00
[52] U.S. Cl. .......................................... 335/198; 336/198
[58] Field of Search ................................. 335/198, 186; 336/198, 208, 192

[56] References Cited

U.S. PATENT DOCUMENTS 4,135,297  1/1979  Guttenberger et al. ................. 29/629
5,420,559  5/1995  Ohshiba et al. ........................ 336/208

OTHER PUBLICATIONS

Von Werner Laeis, Koeln/Troisdorf, "Das Spritzgussverfahren in der Revision*", Kunststoffe, (1961), pp. 97–103.

*Primary Examiner*—Lincoln Donovan
*Attorney, Agent, or Firm*—Foley & Lardner

[57] ABSTRACT

A coil body with an upper section and at least one lower section which has a downward cone shape. The coil body is manufactured from a thermosetting plastic by an injection molding process such that the lower section is provided along its full length with a thin molded tab. Furthermore, an injection mold for forming of the coil body is provided. The lower section of the mold is equipped with at least one blind cavity which is connected to the mold cavity via a gap running the entire height of the mold cavity.

17 Claims, 7 Drawing Sheets

COIL BODY MADE OF SYNTHETIC MATERIAL, AN INJECTION MOLD AND METHOD OF MAKING THE COIL BODY

BACKGROUND OF THE INVENTION

The invention relates to a coil body made of synthetic material, wherein the coil body is provided with an upper and lower section each made from an injection process. The invention further relates to an injection mold for making the coil body and the method for manufacturing the coil body.

DESCRIPTION OF THE RELATED ART

There are various known embodiments of coil bodies used as electrical components, which are inserted by their contact pins into predrilled holes in a printed circuit board.

These coil bodies consist of a single component that typically has a number of flanges on the bottom. These flanges are used as spacers between the coil body and the printed circuit board. These flanges form the lower section of the coil body. Generally, coil bodies are manufactured by an injection molding process using a thermoplastic. During this process the upper section of the coil body is formed in an upper part of an injection mold and the flanges in a lower part of an injection mold. As a result, coil bodies manufactured in this manner show a visible mold seam caused by the parting line of the injection mold.

The miniaturization of electronic components means that the size of coil bodies used must constantly decrease. The simultaneously increasing performance of components leads to greater warming of the coils. For that reason, insulating varnish with an ever higher melting point must be used for the wires of the coil windings.

In order to solder the ends of the windings to the contact pins molded into the coil body, the soldering temperature must be higher than the melting temperature of the insulating varnish. However, when the soldering temperature is greater than the melting temperature of the thermoplastic, the coil body softens during soldering. Thus, the contact pins may become loose and the component fails later on during use.

To avoid this problem, the insulating varnish must currently be removed manually from the ends of the windings. This allows the soldering to be performed at a temperature that is below the melting temperature of the coil body material.

A remedy for this problem is the use of a thermosetting plastic instead of a thermoplastic. However, a problem occurs because the injection molds used for this type of coil body cannot work with thermosetting plastics, because of the different setting behaviors of thermoplastics and thermosetting plastics. Normally, a thermoplastic solidifies during cooling. In thermosetting plastic, the solidification takes place during the curing process when a crosslinking of the molecular structures occurs.

FIGS. 7 to 9 illustrate how a coil body is presently manufactured. The injection mold consists of an upper mold 1 and a lower mold 2. Mold cavity 4 for the upper section of the coil body is provided in the upper part of the injection mold and mold cavities 3 for forming flanges are located in the lower part of the mold 2. As shown in FIG. 9, the injected plastic 9 flows from the upper part 1 of the mold into cavities 3 of injection mold lower part 2. Because of the relatively long period of time the thermoplastic remains in a liquid phase, the air displaced from the mold cavities is able to escape through the material via a venting core 80 along the parting line of the mold sections. But as discussed above the coil body of this material is likely to melt during the soldering process.

Alternatively, if a thermosetting plastic, in which the curing starts very quickly, is injected into this mold, when the melt front has passed the venting core 80, this core is sealed a short time later by the already hardened thermosetting plastic. This results in an air pocket 20 being formed in mold cavity 3. The air in the air pocket 20, although compressed, is unable to escape via the venting core. The result of this is that the flanges are not fully formed. More particularly, the flanges are not of the same structure.

SUMMARY OF THE INVENTION

One of the objectives of the invention is to provide an improved coil body manufactured from thermosetting plastic.

Another objective of the invention is to develop an injection mold that can be used to manufacture these coil bodies.

An alternative objective of the invention is to develop a suitable injection molding process used for making the coil bodies.

To achieve the objective of the coil body of the present invention, a coil body with an upper section and at least one lower section having a downward cone shape is provided. The coil body is manufactured by an injection molding process such that the transition from upper section to lower section is defined by a mold seam, which has been formed by the parting line of the injection mold. The lower section is provided with a flange having a thin tab molded along its full height. Because the lower section of the coil body is provided with a thin tab over its full height, compared to the diameter of the lower section, there is a space created independent of the working cavities through which the air displaced by the melt front escapes.

When a projection which is dimensioned similar to the lower section is cast on the other end of the tab, the escape of all the compressed air volume of the lower section is ensured by it escaping into the projection. This projection has no function as far as the coil body is concerned. It may be removed together with the molded breaking edge tab following forming, so that it does not matter whether casting defects appear in it. When the thickness of the tab is a maximum of one third of the diameter of the lower section, the removal of the projection is simplified.

The objective of developing an injection mold for manufacturing the coil is achieved by providing an injection mold with an upper part and a lower part, in which the mold cavities for molding a coil body are formed between a mold seam. At least one blind cavity in the lower die part is connected to the mold cavity via a gap running the entire height of the mold cavity intended for the coil body.

The blind cavity is provided in the lower part of the injection mold to form a tab on the lower section at the coil body. The blind cavity is connected to the mold cavity via a gap running the entire height of the mold cavity. This ensures that the melt front changes from the vertical flowing direction of the prior art to a horizontal direction. When the blind cavity is connected with its upper end to a horizontal venting core, the complete release of the air in the cavity is ensured.

This injection mold helps achieve the objective of providing a method of manufacturing a coil body with an upper and a lower section. During the method, synthetic material in plastic form is injected under high pressure into an injection mold, which has essentially in the mold release direction, at least one mold cavity sealed by the melt front of the material. This process allows a thin tab to be molded along the height of the mold cavity parallel to the mold release direction. The mold cavity volume is connected to a compensating volume.

This process provides a directional change of the melt front, from the prior art of FIGS. 7–9, at the end of the molding process. This ensures that the component parts of the coil body are fully formed and that no air is trapped in the mold cavities by the poured in synthetic material because the air can be pushed out of the injection mold through the venting core running parallel to the melt front.

In order to ensure that the forming in the mold cavity is completed, the volume of the blind cavity preferably corresponds to the volume of the mold cavity. When a coil body with several lower sections, for example flanges, is to be molded, then each of the mold cavities should be provided with its own blind cavity.

A coil body, injection mold, and method of manufacture of the coil body according to the invention provide the objectives as stated above, which will become apparent from the detailed description given hereafter. It should be understood, however, that the detailed description, while indicating a preferred embodiment of the invention, is given by way of illustration only since various changes and modifications within the scope of the invention will become apparent to those skilled in the art.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 6:
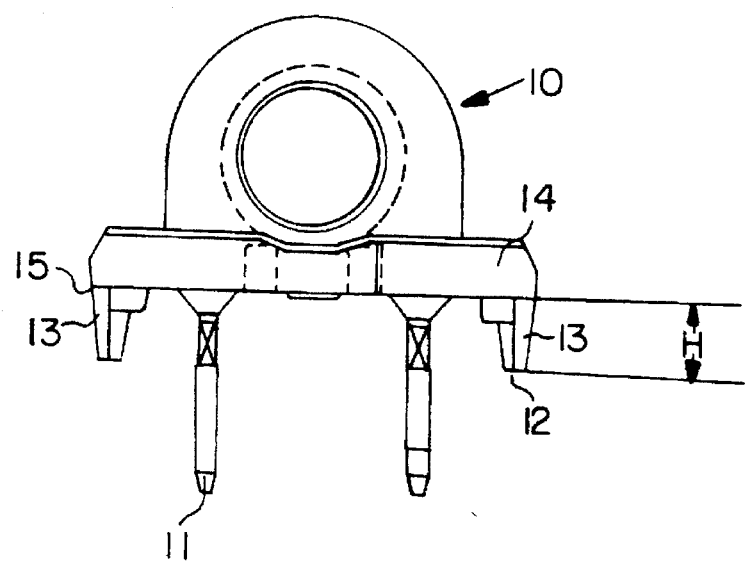
FIG. 6 shows the coil body of the present invention.
Figure 6A:
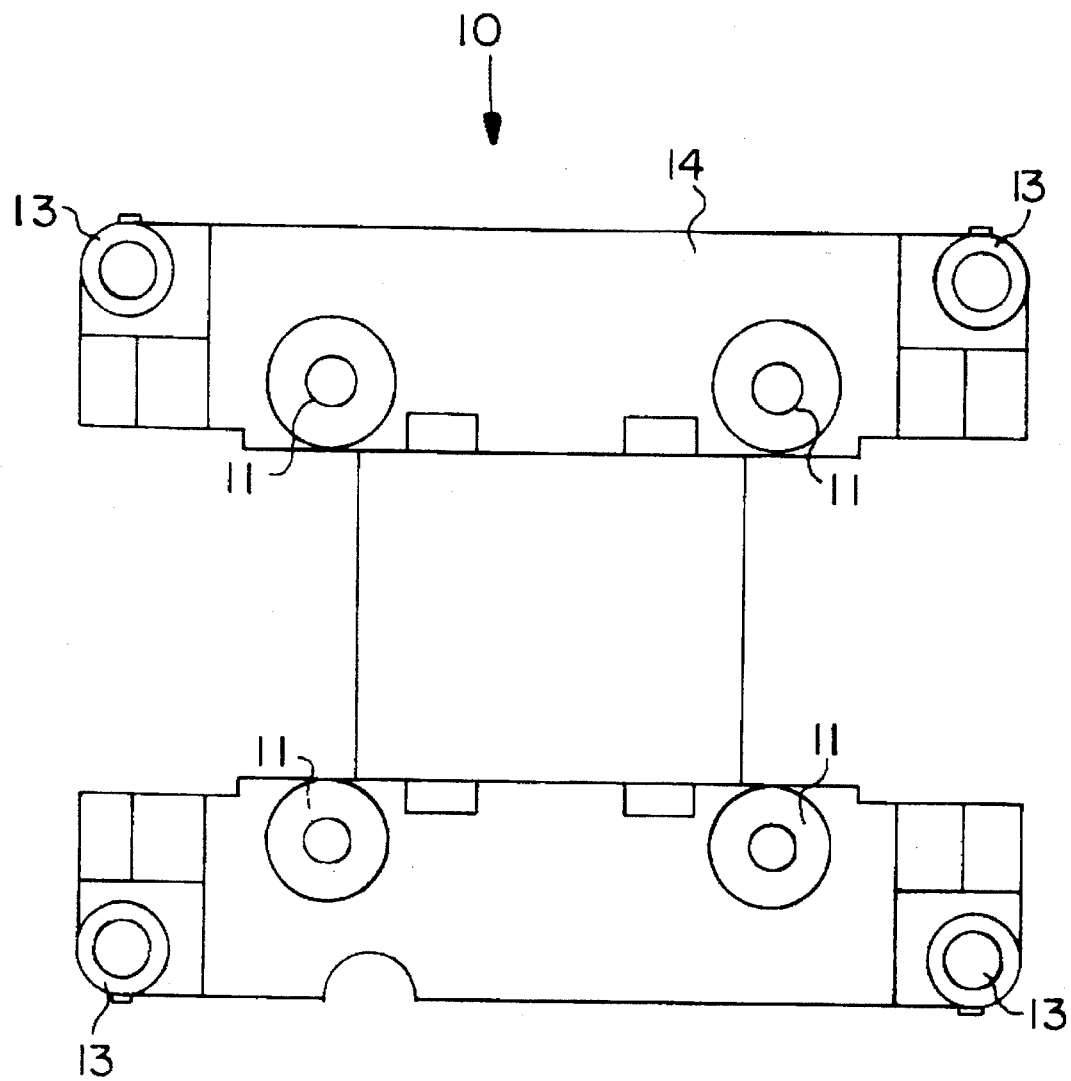
FIG. 6a shows a bottom view of the coil body shown in FIG. 6.

The coil body 10 of the present invention is shown in FIG. 6. The coil body 10 consists of an upper section 14 with attached, downwardly projecting flanges 13. As shown in FIG. 6a, the coil body 10 has four symmetrically arranged flanges 13 on upper section 14. Several contact pins 11, which are soldered to the coil windings, are set into the lower section of the coil body 10. The flanges 13 serve as spacers for the coil body 10 on a printed circuit board, not illustrated here, in which the contact pins 11 are inserted.

The upper section 14 of the coil body 10 is formed in the upper part of the injection mold 1 and the flanges 13 are formed in the lower part of the injection mold 2. As a result, the parting line joint 5 of the mold sections leaves a mold seam 15 on coil body 10. This mold seam 15 forms the division between the coil body upper section 14 and flanges 13 which comprise the lower section of the coil body. Along the entire length H of the flanges 13, a thin tab 12 is molded. The thickness of the tab 12 decreases downward in a cone-shaped fashion compared to the diameter of flanges 13.

Figure 7:
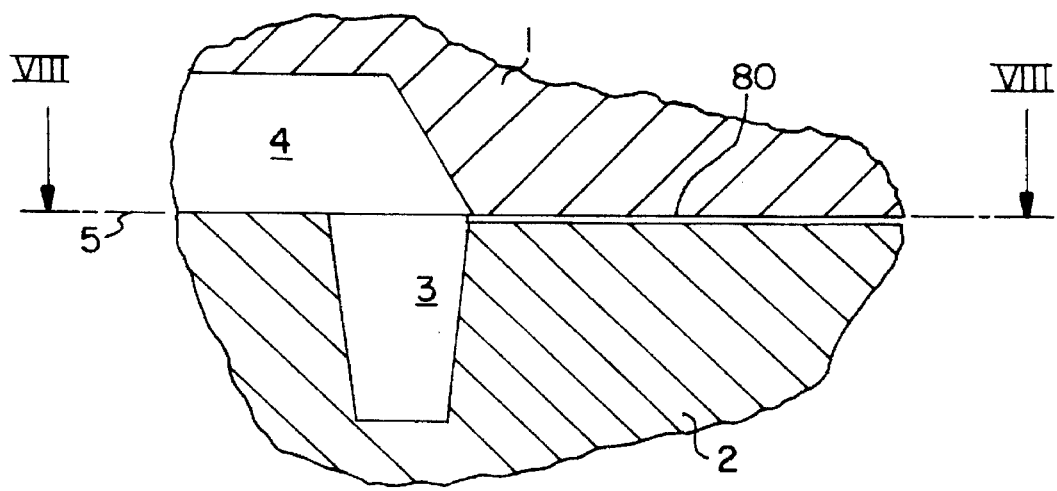
FIG. 7 shows a partial section through an injection mold of current technology.
Figure 8:
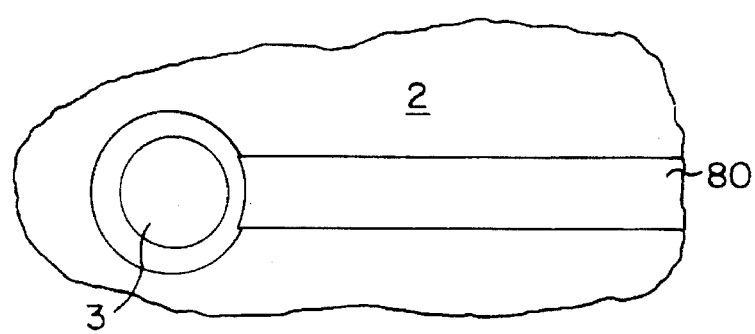
FIG. 8 shows a partial top view of the lower part of the mold along line VIII—VIII as shown in FIG. 7.
Figure 9:
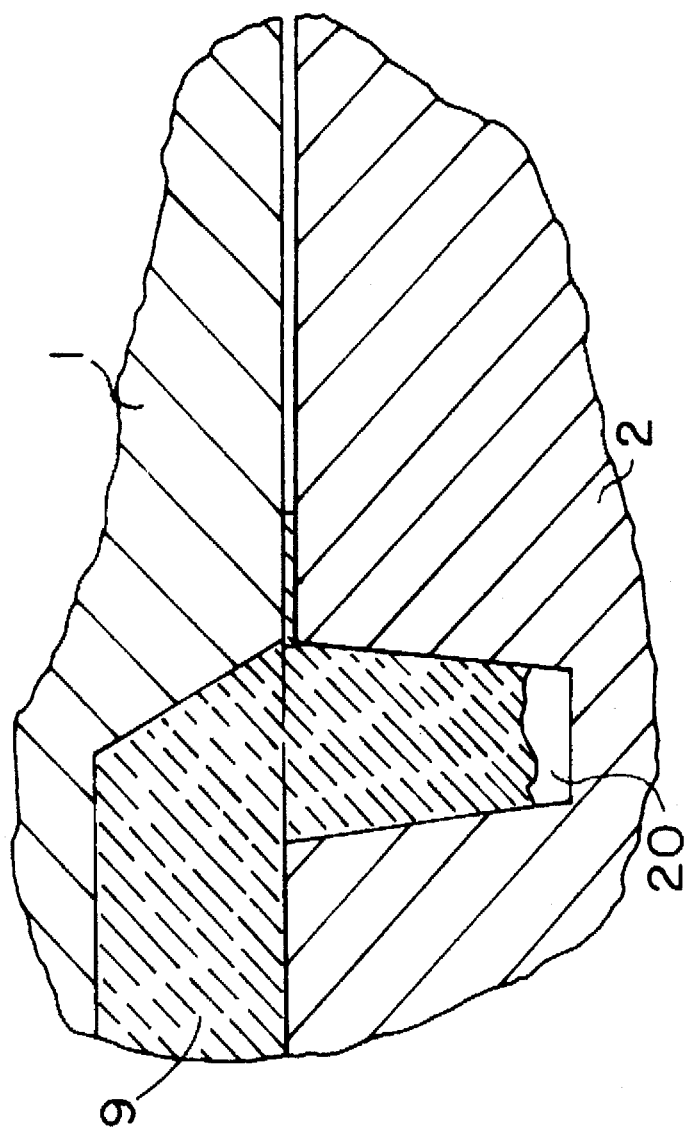
FIG. 9 shows a representation of the flow of a thermosetting plastic in the injection mold according to FIG. 7 at the end of the molding process.

Illustrated in FIGS. 1–5 is the injection mold according to the present invention. For convenience, the same reference numerals have been used for those components of the injection mold of the current technology shown in FIGS. 7 and 8.

The injection mold of the present invention consists of an upper part of the mold 1 and a lower part 2 which can be joined together, in a known fashion, such that the molded components can be formed with a mold seam 15 created between them. Mold cavity 4, located in upper part of the mold 1, is used for forming the upper section of the coil body 14. Mold cavity 3, in the lower part of the mold 2, is used to form the flanges 13. Mold cavity 3 is cone-shaped in a downward direction from cavity 4 and its upper area 3' is greater in diameter than the lower area 3".

Figure 1:
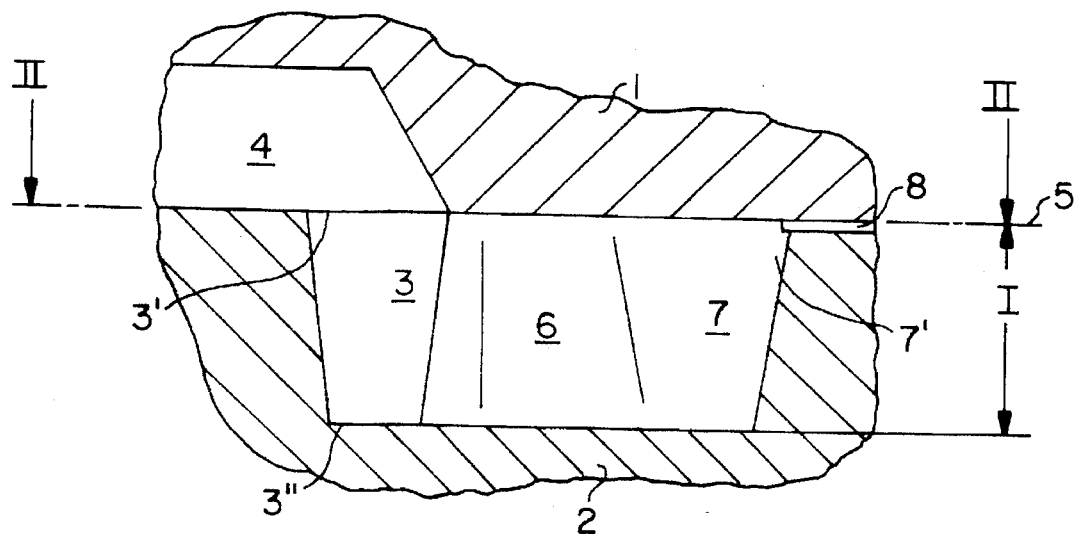
FIG. 1 shows a partial section through the injection mold of the present invention.
Figure 2:
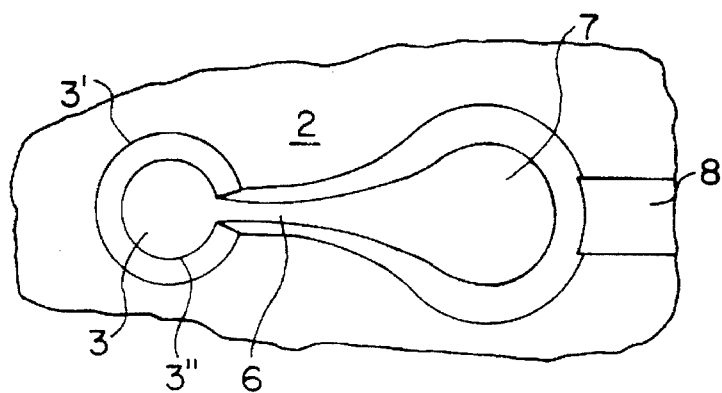
FIG. 2 shows a partial top view of the lower part of the injection mold along line II—II shown in FIG. 1.
Figure 2A:
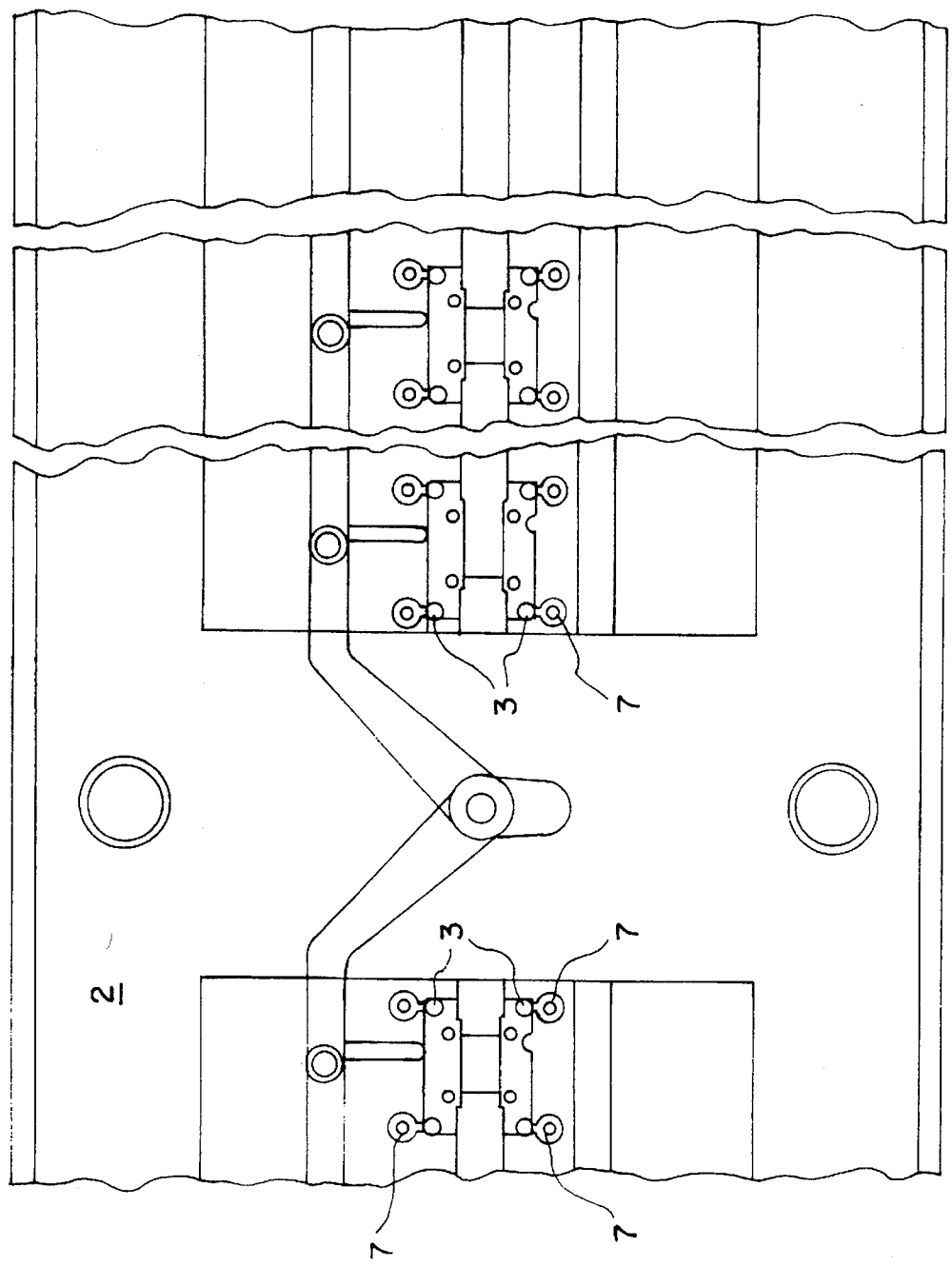
FIG. 2a shows a top view of the lower part of a plurality of injection molds of the present invention.

As shown in FIGS. 1 and 2, at the side of the mold cavity 3 and extending across the entire height I, a downward progressing vertical gap 6 is provided in the lower part of the mold 2. This vertical gap 6 opens at one end to the mold cavity 3 and at its other end to a blind cavity 7. The blind cavity 7 is also a mold cavity having a volume that is at least equal to the volume of mold cavity 3. The blind cavity 7 is called thus because it produces a component that is not necessary for the molded coil body 10. The blind cavity 7 at its upper end 7' is connected to a venting core 8. Both gap 6 and blind cavity 7 are cone shaped, which is necessary for the removal of the molded component. FIG. 2a is a top view of the lower part of the mold 2 showing several evenly spaced mold cavities 3, each provided with a blind cavity 7.

Figure 3:
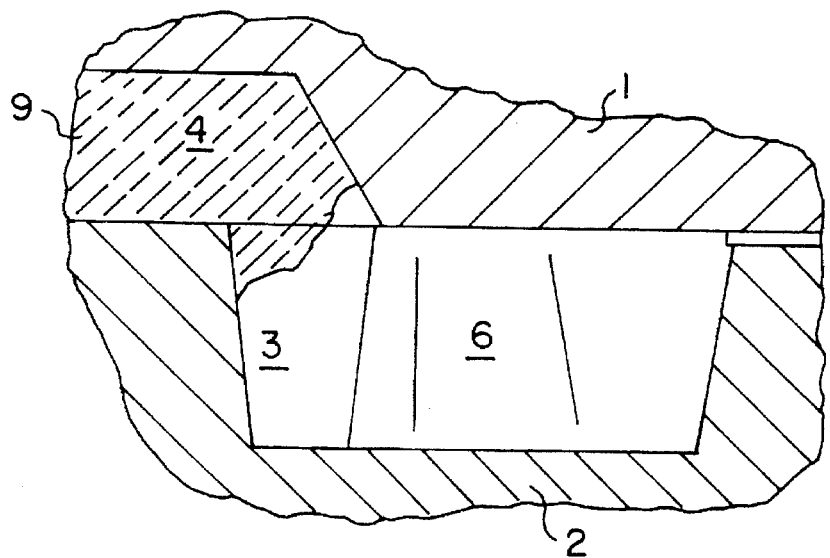
FIGS. 3–5 show the progression of the melt front of the injected synthetic material, as it proceeds through the injection mold of FIG. 1.
Figure 4:
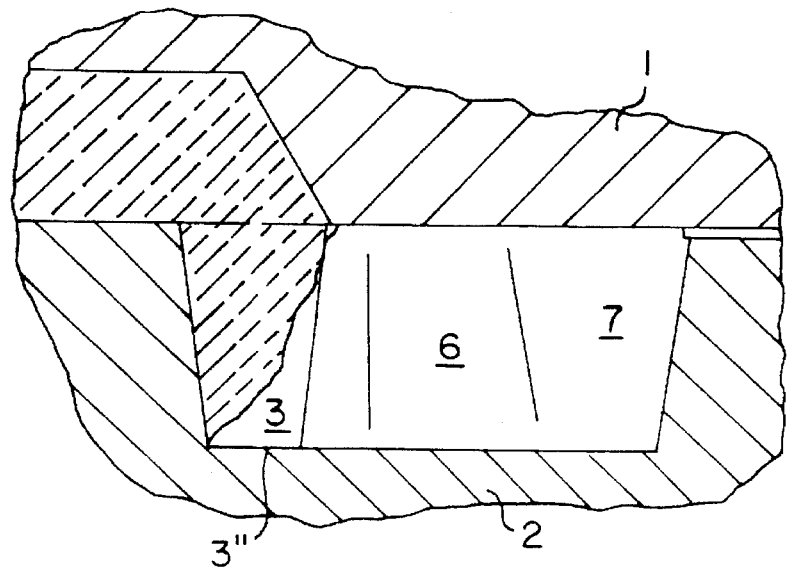
Figure 5:
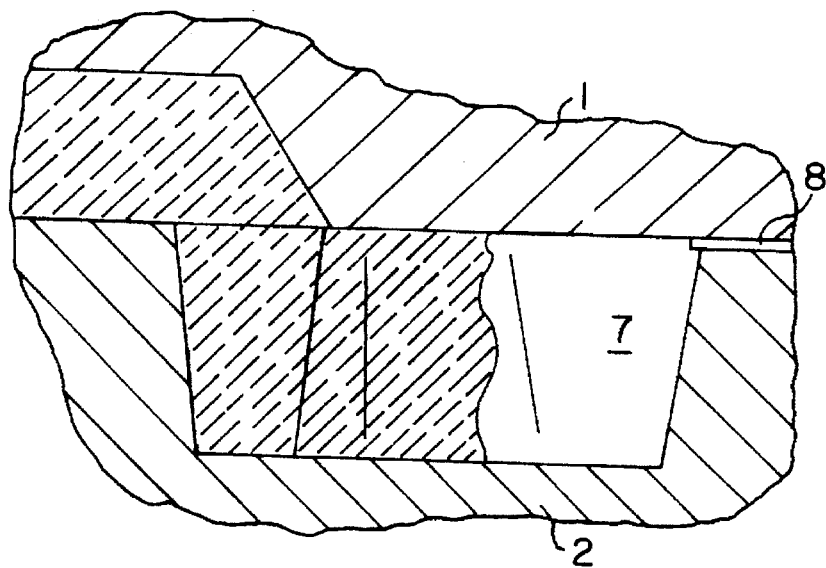

As shown in FIGS. 3–5, the injected thermosetting plastic 9, which preferably is an unsaturated polyester compound, flows through mold cavity 4 into mold cavity 3. The air thereby expelled escapes into the narrow gap 6. Mold cavity 3 and gap 6 are filled evenly with plastic, while the melt front moves on in the direction of the blind cavity 7. Because the flow of the material in the present invention is not in the vertical direction as with the prior art, but in a horizontal direction (see FIG. 5), the air is fully evacuated from blind cavity 7 via venting core 8.

After the molded component has cured, it is removed from the mold in the known manner, not illustrated here, using an ejection ram.

It will be understood that various modifications in the form of the invention as described herein in its preferred embodiment may be made without departing from the spirit thereof and of the scope of the claims which follow.

What is claimed is:

1. A coil body, comprising:
    an upper section and at least one lower section having a cone shape projecting downwardly from the upper section;
    wherein the upper section and the at least one lower section are manufactured by an injection process such that the transition from upper section to lower section is defined by a mold seam formed by a parting line of an injection mold; and wherein the at least one lower section includes a flange provided with a thin tab, molded along a full height of the flange.

2. A coil body according to claim 1, wherein the tab is removable from the flange.

3. A coil body according to claim 1, wherein the tab is connected to the flange by a projection running parallel to the tab; and wherein the projection is approximately equal to a dimensions of the flange.

4. A coil body according to claim 1, wherein the at least one lower section includes several lower sections.

5. A coil body according to claim 4, wherein the several lower sections include four identically shaped flanges arranged symmetrically on the upper section.

6. A coil body according to claim 1, wherein the upper section and lower section include a thermosetting plastic.

7. A coil body according to claim 6, wherein the thermosetting plastic includes an unsaturated polyester compound.

8. A coil body according to claim 1, wherein the tab has a thickness that at a maximum is equal to one third of a diameter of the flange.

9. An injection mold, comprising:

an upper part and a lower part, each part having at least one mold cavity for molding a coil body; and a parting line joint formed between the cavities;

wherein at least one blind cavity in the lower part is connected to the mold cavity therein via a gap running an entire height of the mold cavity.

10. An injection mold according to claim 9, wherein the blind cavity is connected at an upper end to a venting core.

11. An injection mold according to claim 10, wherein a volume of the blind cavity is at least as great as a volume of the mold cavity to which the blind cavity is connected.

12. An injection mold according to claim 9, wherein the lower part includes several evenly arranged mold cavities, each provided with a respective blind cavity.

13. An injection mold according to claim 9, wherein a thickness of the gap is narrower than a diameter of the mold cavity such that the gap forms a thin tab on the coil body.

14. A coil body, comprising:

an upper section and at least one lower section having a downwardly shaped cone;

wherein the upper section and the at least one lower section are manufactured by an injection molding process such that a transition from upper section to lower section is defined by a molded seam which has been formed by joints of an injection mold; and wherein the at least one lower section includes a flange provided along the full height of the flange with a molded breaking edge.

15. A method of manufacturing an injection molded coil body having an upper and a lower section, comprising the steps of:

injecting synthetic material in plastic form under high pressure into an injection mold;

providing essentially in a mold release direction of the mold at least one mold cavity sealed by a melt front of the material;

forming a thin tab on said lower section by molding along the height of the mold cavity parallel to the mold release direction; and providing the mold cavity with a volume that is connected to a compensating volume.

16. The method according to claim 15, wherein the step of providing the mold cavity with a volume further comprises the step of providing a blind cavity for the compensating volume.

17. The method according to claim 15, further comprising the step of pushing, by the melt front of the synthetic material, air present in the injection mold into a venting core connected to the compensating volume.

* * * * *